United States Patent Office 3,441,604
Patented Apr. 29, 1969

3,441,604
PROCESS FOR PRODUCING DICARBOXYLIC ACIDS
Eric Keith Baylis, Offerton, Stockport, Wilfred Pickles, Hazel Grove, Stockport, and Kenneth David Sparrow, Stockport, England, assignors to Geigy Chemical Corporation, Greenburgh, N.Y., a corporation of Delaware
No Drawing. Filed Aug. 27, 1965, Ser. No. 483,359
Claims priority, application Great Britain, Sept. 1, 1964, 35,652/64
Int. Cl. C07c 51/06
U.S. Cl. 260—533         8 Claims

ABSTRACT OF THE DISCLOSURE

The reaction of a cycloalkene and ozone to form dicarboxylic acids is improved by forming the ozonide without the addition of water and adding at least 10% by weight water during the ozonide decomposition step.

---

The present invention relates to the production of dicarboxylic acids and in particular to the production of dicarboxylic acids from cyclic alkenes.

It is known to produce dicarboxylic acids from cycloalkenes by first mixing the cycloalkene in highly purified condition with propionic acid which is commercially available in a substantially anhydrous form, introducing ozone into the mixture to form an ozonide of the cycloalkene, and, in a second step, converting the ozonide to a mixture of lower $\alpha,\omega$-dicarboxylic acid and $\alpha,\omega$-aldehyde-acid, by thermal cleavage with or without a mild oxidizing agent, for example oxygen containing a small amount of ozone.

When thermal cleavage is brought about without the use of an oxidizing agent, a small amount of water (up to 5%) was added to counteract the highly exothermic reaction and to maintain a constant temperature. However, this affords a reaction product which contains, in substantially equal proportions the desired $\alpha,\omega$-dicarboxylic acid, in mixture with $\alpha,\omega$-aldehyde acid, which is undesirable as a final product in the process according to the invention.

It is, therefore, a principal object of the invention to provide an improved process, whereby yield rates well above 60%, calculated on the weight of the starting alkene, can be attained for the desired $\alpha,\omega$-alkane-dioic acid.

This is achieved according to the present invention by an improved process which comprises:

(a) Reacting a cycloalkene, i.e. a cyclic hydrocarbon having a single double bond in the ring, of at least 5 carbon atoms and preferably from 8 to 12 carbon atoms in the ring, in mixture with an alkanoic acid containing from 1 to 6 carbon atoms, preferably propionic acid, as solvent, with ozone, without or, preferably, with the addition of water not exceeding an amount which still leaves the reaction medium homogeneous;

(b) Oxidatively decomposing the resulting ozonide of the cyclic alkene, with as oxidizing agent, air or oxygen, substantially free from ozone, in alkanoic acid of from 1 to 6 carbon atoms, preferably the same as used in step (a), with addition of sufficient water so that the amount thereof present during step (b) is at least 10% by weight based on the total weight of the reaction mixture;

(c) Recovering the resulting $\alpha,\omega$-alkanedioic acid from the reaction mixture.

The amount of water to be added in step (b) depends on the amount of water added in step (a) and thus ranges from 0%, if at least 10% of water had been added in step (a), to such amount that the reaction mixture remains substantially homogeneous throughout step (b).

It is preferred to have such limited proportion of water present in the first stage merely to assist in case of oxidative breakdown of the ozonide during the ozanisation reaction. Any such oxidative breakdown of the ozonide during the ozonisation reaction is expected to be minor due to the low temperature.

The addition of too much water in the first stage causes phase separation, which may lead to inefficient conversion of the cyclic olefine to the ozonide. Water added during the ozonisation stage is usually not consumed and should be present during the subsequent decomposition stage.

The cyclic monoene used in the process of the invention contains from five to twenty, and preferably from eight to twelve carbon atoms in the carbocyclic ring. Examples of such monoenes include cyclopentene, cyclohexene, cycloheptene, cyclooctene, cyclodecene and cyclododecene. However, it is preferred to use cyclooctene or cyclododecene in the process of the invention. The cyclic monoene may be unsubstituted or substituted with, for example, one or more alkyl, cycloalkyl or aralkyl groups.

The cyclic monoene can be reacted conveniently with ozone in the form of ozonised oxygen. The proportion of ozone in the ozonized oxygen used in this stage of the process of the invention can vary within a wide range but is preferably from 1.0% to 5.0% by weight. The cyclic monoene is preferably dissolved in the fatty acid solvent before being contacted with the ozone.

Fatty acid solvents suitable in the process of the invention, are for instance, formic acid, acetic acid, propionic acid or butyric acid, but propionic acid is preferred. Water can be present during the ozonisation stage, however, it is a preferred condition that the reaction medium remains homogeneous during the ozonisation stage. Hence, the proportion of water which can be present during the ozonisation stage is limited by the solubility of the cyclic monoene in an aqueous fatty acid solvent. In general, however, it is preferred that a proportion of water is present during the ozonisation stage within the range of from 1% to 10% by weight based on the weight of the fatty acid solution of the cyclic monoene.

The concentration of the cyclic monoene in the fatty acid solvent prior to contacting the solution with the ozone is preferably within the range of from 10% to 40% by weight, based on the weight of the fatty acid and more preferably within the range of from 20% to 35% by weight based on the weight of the fatty acid.

The cyclic monoene is preferably reacted with ozone at a temperature not exceeding 40° C., and more preferably at a temperature not exceeding 30° C. The ozonisation is desirably carried out until all or substantially all of the ethylenically unsaturated bond in the carbocyclic ring of the starting material has been converted to the ozonide. The completion of the reaction can be detected, for example, by passing the effluent gases from the ozonisation reaction mixture through an aqueous solution of potassium iodide/boric acid, the characteristic color of free iodine marking the completion of the ozonisation reaction.

The ozonide of the cyclic monoene which is produced by the reaction with ozone can be isolated by removal of the fatty acid solvent and water if, desired, but as ozonides tend in general to be unstable compounds, it is preferred to subject the crude ozonide, as soon as it is produced, to the oxidative decomposition procedure. However, if desired, the ozonide can be partially purified before being subjected to the decomposition conditions.

The oxidative decomposition of the fatty acid solution of the ozonide, which solution results from the first stage of the process, is preferably carried out by adding at least 10% by weight of water to the ozonide solution, and contacting the thus diluted ozonide solution with air or oxygen at an elevated temperature. The proportion of water which is added after the ozonisation stage, but before or during the oxidative decomposition of the ozonide or ozonide-containing material produced in the first stage of the process, amounts to at least 10% by weight, based on the total weight of the fatty acid solution, of the ozonide. Part of the water content in the oxidative decomposition stage of the process can be water produced chemically from the ozonide, and in general this will remain to be present unless deliberately removed. Any water produced chemically from the ozonide will, in practice, however, be minor compared with the amount added deliberately, and unless a further substantial quantity of water is added to the product of the ozonisation stage after the ozonisation stage but before or during the decomposition stage, comparatively low yields of the desired dicarboxylic acid are obtained. In order to achieve good yields of the dicarboxylic acid in a state of high purity, it is preferred to have present in the oxidative decomposition stage, a proportion of water within the range of from 10% to 50% by weight based on the total weight of the fatty acid solution of the ozonide. However, although the upper limit on the amount of water which can be present in the oxidative decomposition stage is not critical, it is preferred that the reaction mixture remains homogeneous throughout the decomposition stage; consequently the amount of water should not be sufficient to precipitate the ozonide from solution.

Thus, it is particularly preferred to have present in the decomposition stage a proportion of water in the range of from 25% to 35% by weight based on the total weight of the fatty acid solution of the ozonide, this particularly preferred proportion of water leading to optimum yields of desired high-purity α,ω-dicarboxylic acid and yet maintaining a homogeneous reaction mixture throughout the oxidative decomposition stage.

Part or all of the water present during the oxidative decomposition stage is preferably removed by distillation. In those cases where the fatty acid solvent used in the process of the invention forms an azeotrope with water, as in the case of propionic acid and butyric acid, the water can be conveniently removed as the azeotrope. Acetic acid, however, does not form a water azeotrope, and consequently if acetic acid is used as the solvent in the process of the invention, water alone can be removed by distillation during the oxidative decomposition stage. By controlling the proportion of water removed during the oxidative decomposition stage, an optimum yield rate of the desired α,ω-dicarboxylic acid in a state of high purity can be obtained.

The oxidative decomposition of the ozonide can be effected at a temperature in the range of from 50° to 200° C.; however, a temperature in the range of from 55° to 150° C. is preferred. It is also preferred that the temperature of the ozonide solution is raised slowly to the reflux temperature of the solution. It is particularly preferred that the temperature of the ozonide solution is raised stepwise from 55° C. to the reflux temperature of the solution over a substantial period of time, such as for example, three hours to ten hours but more particularly over a period of time within the range of from four hours to six hours.

Whilst the presence of an added catalyst during the oxidative decomposition stage is not essential, a compound of a metal having variable valency, for example, manganese acetate, ferric oxide or chromic acid, or phosphoric acid, polyphosphoric acid or other catalysts can be present if desired. Hydrogen peroxide can be used, if desired, as a source of oxygen in the oxidative decomposition of the ozonide.

The α,ω-dicarboxylic acid produced by the process of the present invention is obtained in high yield (about 60%) and in a state of high purity on crystallization from the process mixture. Consequently no purification techniques are normally required to separate undesirable by-products such as aldehyde-acids and lower dicarboxylic acid.

The α,ω-dicarboxylic acids produced by the process of the present invention are known compounds having a variety of known applications. Esters of the acids are, for example, valuable plasticisers for synthetic polymeric materials and valuable components of synthetic lubricants having high thermal stability.

The following non-limitative examples further illustrate the present invention. Parts shown therein are parts by weight unless otherwise stated. Percentages are also expressed by weight unless otherwise stated.

EXAMPLES WITHOUT ADDITION OF WATER DURING OZONISATION STAGE

Example 1

(a) 16.6 parts of cyclododecene were dissolved in 49.8 parts of propionic acid and the solution maintained at 25° C. Ozonised oxygen containing 3% weight/weight of ozone was passed at 60 liters/hour through the solution of cyclododecene in propionic acid until the ozonisation of the cyclododecene was complete as indicated by the formation of iodine when the effluent gases from the reaction mixture were tested with aqueoun potassium iodide/boric acid. No water was added during this ozonisation stage.

(b) 6.6 parts (10% by weight based on the total weight of the reaction mixture) of water were added to the reaction mixture and oxygen was passed at 60 liters/hour through the diluted reaction mixture while the temperature of the mixture was quickly raised to 55° C. The passage of oxygen was maintained at the same rate while the temperature of the reaction mixture was raised from 55° to 65° C. over a period of one hour, from 65° to 75° C. over a period of one hour, from 75° to 85° C. over a period of three hours and from 85° C. to the reflux temperature of the mixture over a period of one hour. 4.1 parts of the water/propionic acid azeotropic mixture were removed during the final reflux period. On cooling the reaction mixture, the product precipitated as a white crystalline solid which was filtered off and dried.

In this way, 14.4 parts of 1:12 dodecanedioic acid were obtained, having melting point 130° C. and a purity of 92.3% according to G.L.C. analysis, representing a yield of 57.8% of the theoretical.

Example 2

The procedure described in Example 1 was carried out under the same conditions, and using the same reactants, except that the amount of water added during the oxidative decomposition step was raised to 20.8 parts, corresponding to 29% based on the total weight of the reaction mixture.

In this way, about 15 parts of 1:12-dodecanedioic acid having a melting point of 130° C. and a purity of about 95% were obtained, corresponding to a yield rate of 65% of the theoretical.

COMPARATIVE EXAMPLE A

By repeating, for the sake of comparison, the procedure described in Example 1, but using only 3.3 parts of water (5% by weight based on the total weight of the reaction mixture), in the oxidative decomposition stage, only 13.0 parts of 1:12-dodecanedioic acid were obtained having melting point 121° C. and a purity of 87.2% according to G.L.C. analysis, representing a yield of 49.3% of the theoretical.

These results demonstrate that in order to produce an α,ω-dicarboxylic acid in good yield and in a state of high purity by the process of the present invention, a substantial amount of water, i.e. at least 10% by weight based on the total weight of the reaction mixture should be present during the oxidative decomposition stage, when no water is added during the preceding ozonisation stage.

Further comparisons were made with a somewhat different, known method as described in the following comparative examples.

COMPARATIVE EXAMPLE B

A mixture of 16.6 parts of cyclododecene and 166 parts of propionic acid was placed in a reaction vessel equipped with an efficient stirring device and a reflux condenser. The mixture was cooled to −10° C. and an oxygen stream containing from 3–4% ozone was passed through the mixture at a rate of 1 liter/minute. When the cyclododencene was saturated with ozone as indicated by a potassium iodide trap, the ozone concentration in the oxygen stream was reduced to less than 0.5% and the reaction mixture heated to 110° C. The reaction mixture was maintained at this temperature, with the oxygen/ozone stream (less than 0.5%) passing through for one hour. 4 parts (2.2% by weight) of water were added to counteract the exothermic reaction and maintain a constant reaction temperature. The propionic acid solvent was removed by vacuum distillation. The crude product (21.3 parts; theory 23.0 parts, in a yield rate of 92.5%), had a 1,12-dodecanedioic acid content of only 69.8% representing a yield of 65.3% of the theoretical, while the products obtained in Examples 1 and 2 at a similar yield rate have a purity of above 90%.

COMPARATIVE EXAMPLE C

The procedure described in Example A above was repeated except that no water was added in the oxidative decomposition stage. In this way 21.3 parts of crude product were obtained having a 1,12-dodecanedioic acid content of only 66.0% representing a yield of 61.7% of the theoretical.

Comparative Example B confirmed our experience that the exothermic reaction in the oxidative decomposition stage is only minor, and consequently little if any water is required for cooling purposes.

Although these known methods produce high weight yields, these are of crude products of only unsatisfactory purity which requires further wasteful purification treatment in order to obtain a product of a similar high degree of purity as is obtained by the method according to the invention, illustrated in the preceding Examples 1 and 2.

EXAMPLES WITH ADDITION OF WATER IN OZONISATION STAGE

Example 3

16.6 parts of cyclododecene were dissolved in a mixed solution of 49.8 parts of propionic acid and 3.0 parts of water (about 4.5% by weight based on the weight of the propionic acid solution of cyclododecene), and the solution was maintained at 25° C. Ozonised oxygen containing 3% weight/weight of ozone was passed at the rate of 60 liters/hour through the solution until the ozonisation of the cyclododecene was complete as indicated by the formation of iodine when the effluent gases from the reaction mixture were tested with aqueous potassium iodide/boric acid.

20.8 parts of water (29% by weight based on the total weight of the reaction mixture) were added to the reaction mixture and oxygen was passed at 60 liters/hour through the diluted reaction mixture while the temperature of the mixture was quickly raised to 55° C. The passage of oxygen was maintained at the same rate while the temperature of the reaction mixture was raised from 55° to 65° C. over a period of one hour, from 65° to 75° C. over a period of one hour, from 75° to 85° C. over a period of three hours and from 85° C. to the reflux temperature of the mixture over a period of one hour. Half the total water added (12.0 parts) was removed as an azeotrope with propionic acid during the reflux period. On cooling the reaction mixture, the product separated from the reaction mixture as a white crystalline solid which was filtered off, and dried.

In this way, 17.0 parts by weight of 1:12-dodecanedioic acid were obtained, having melting point 130° C. and a purity of 97 to 98% according to G.L.C. analysis, representing a yield of 74% of the theoretical.

When cyclododecene was replaced in Example 3 by the stoichiometric equivalent of cyclopentene, cyclohexene or cyclodecene, the procedure being otherwise substantially the same, the corresponding α,ω-dicarboxylic acid was obtained.

Examples 4 to 9

The procedure described in Example 3 was carried out under the same conditions and using the same reactants, except that the amount of water used in the ozonisation step was varied. The amount of water used in the ozonisation step and the yields of 1:12-dodecanedioic acid of purity at least 97% obtained are shown in the following table. The data for Example 2 are added to facilitate comparison.

TABLE I

| Example | Amount of water in ozonisation step | | Yield of $C_{12}$ dibasic acid (percent) |
|---|---|---|---|
| | Parts | Percent | |
| 2 | Nil | | 65 |
| 4 | 1.0 | 1.5 | 70 |
| 5 | 2.0 | 3.0 | 68 |
| 6 | 3.5 | 5.3 | 70 |
| 7 | 4.0 | 6.0 | 69 |
| 8 | 4.5 | 6.7 | 67 |
| 9 | 18.0 | 27 | 65 |

These results demonstrate the advantage of having water present during the ozonisation step. However, if too much water is present and phase separation of the ozonisation reaction mixture occurs, yields of dicarboxylic acid are reduced.

Examples 10 to 12

The procedure described in Example 3 was carried out under the same conditions and using the same reactants, except that the amount of water employed in the oxidative decomposition step was varied. The amount of water used in the oxidative decomposition step and the yield of 1:12-dodecanedioic acid obtained are shown in the following Table II. The yield of 1:12-dodecanedioic acid obtained in Example 3 is included for comparison.

TABLE II

| Example | Amount of water added prior to decomposition step but after ozonisation step | | Yield of $C_{12}$ dibasic acid (percent) |
|---|---|---|---|
| | Parts | Percent | |
| 10 | Nil | | 57 |
| 3 | 20.8 | 29 | 74 |
| 11 | 34.7 | 50 | 70 |
| 12 | 69.4 | 100 | 72 |

These results demonstrate that the addition of water after the ozonisation step and before the oxidative decomposition step leads to optimum yields of α,ω-dicarboxylic acid.

Example 13

11.7 parts of cyclooctene (of 93% purity) were dissolved in a mixed solution of 35.1 parts of propionic acid and 2.0 parts of water, and the solution was maintained at 5° C. Ozonised oxygen containing 3% weight/weight of ozone was passed at 60 liters/hour through the solution until the ozonisation of cyclooctene was complete as indicated by the formation of iodine when the effluent gases from the reaction mixture were tested with aqueous potassium iodide/boric acid.

16 parts of water were added to the reaction mixture and oxygen was passed at 12 liters/hour while the temperature of the mixture was quickly raised to 55° C. The passage of oxygen was maintained while the temperature of the reaction mixture was raised from 55° to 65° C. over a period of one hour, from 75° to 85° C. over a period of three hours, from 85° to 95° C. over a period of one hour and from 95° to the reflux temperature over a period of one hour. 35 parts of the azeotropic mixture of solvent propionic acid and water were removed during the reflux period. On cooling, the product separated from the reaction mixture as a white crystalline solid which was filtered off and dried.

In this way 10.5 parts by weight of suberic acid were obtained having melting point 140° C., representing a yield of 60.5% of the theoretical.

We claim:
1. A process for producing $\alpha,\omega$-dicarboxylic acid, comprising:
   (a) reacting a cycloalkene of from 5 to 12 carbon atoms in the ring, in mixture with a substantially anhydrous alkanoic acid containing from 1 to 6 carbon atoms, with ozone without the addition of water during this process step;
   (b) oxidatively decomposing the resulting ozonide of the cyclic alkene, with air or oxygen, substantially free from ozone, in alkanoic acid of from 1 to 6 carbon atoms, with addition of sufficient water so that the amount thereof present during step (b) is at least 10% by weight based on the total weight of the reaction mixture, and
   (c) recovering the resulting $\alpha,\omega$-alkanedioic acid from the reaction mixture.
2. A process for producing $\alpha,\omega$-dicarboxylic acid, comprising:
   (a) reacting a cycloalkene of from 5 to 12 carbon atoms in the ring with ozone, in mixture with an alkanoic acid containing from 1 to 6 carbon atoms, and water in an amount not exceeding that amount which still leaves the reaction medium homogeneous;
   (b) oxidatively decomposing the resulting ozonide of the cyclic alkene, with air or oxygen, substantially free from ozone, in an alkanoic acid of from 1 to 6 carbon atoms, with addition of from 0% of water to such amount thereof that the reaction mixture remains substantially homogeneous throughout step (b), and
   (c) recovering the resulting $\alpha,\omega$-alkanedioic acid from the reaction mixture, the total amount of water present in step (b) being at least equal to 10% calculated on the total weight of the reaction mixture.
3. A process as defined in claim 2, wherein the temperature during step (a) does not exceed 40° C.
4. A process as defined in claim 2, wherein the proportion of water present during the decomposition stage is within the range of 25 to 35% by weight, based on the total weight of the alkanoic acid solution of the ozonide.
5. A process as defined in claim 2, wherein the temperature during step (b) is in the range of from 50 to 200° C.
6. A process as defined in claim 2, wherein the temperature in step (b) is in the range of from 55 to 150° C.
7. A process as defined in claim 2, wherein the temperature of the ozonide solution in step (b) is raised stepwise from 55° C. to the reflux temperature of the solution.
8. A process as defined in claim 7, wherein the raising of the temperature from 55° C. to the reflux temperature of the solution takes place over a period ranging from 3 to 10 hours.

References Cited
UNITED STATES PATENTS

| | | | |
|---|---|---|---|
| 3,280,183 | 10/1966 | Maggiolo et al. | 260—533 |
| 3,219,675 | 11/1965 | Seekircher | 260—533 |
| 3,383,398 | 7/1968 | Peck et al. | 260—533 |

LORRAINE A. WEINBERGER, *Primary Examiner.*

D. STENZEL, *Assistant Examiner.*

U.S. Cl. X.R.

260—331